United States Patent
Shaw

(10) Patent No.: US 8,962,088 B2
(45) Date of Patent: Feb. 24, 2015

(54) METHOD AND FINISH FOR CONCRETE WALLS

(71) Applicant: Lithocrete, Inc., Costa Mesa, CA (US)

(72) Inventor: Ronald D. Shaw, Corona Del Mar, CA (US)

(73) Assignee: Lithocrete, Inc., Costa Mesa, CA (US)

( * ) Notice: Subject to any disclaimer, the term of this patent is extended or adjusted under 35 U.S.C. 154(b) by 4 days.

(21) Appl. No.: 13/836,419

(22) Filed: Mar. 15, 2013

(65) Prior Publication Data

US 2014/0272147 A1    Sep. 18, 2014

(51) Int. Cl.
    *E04B 2/84*    (2006.01)

(52) U.S. Cl.
    CPC ..................... *E04B 2/845* (2013.01)
    USPC ......... 427/331; 427/421.1; 428/206; 264/293

(58) Field of Classification Search
    USPC ................. 427/421.1, 331; 428/206; 264/293
    See application file for complete search history.

(56) References Cited

U.S. PATENT DOCUMENTS

| | | |
|---|---|---|
| 348,443 A | 8/1886 | Anderson |
| 418,840 A | 1/1890 | Hettich |
| 712,168 A | 10/1902 | Worth |
| 738,704 A | 9/1903 | Semmer |
| 745,068 A | 11/1903 | Menezarski |
| 763,064 A | 6/1904 | Mercer |
| 821,277 A | 5/1906 | Bellars |
| 828,031 A | 8/1906 | Kemper |
| 830,747 A | 9/1906 | Stauffer |
| 836,369 A | 11/1906 | Dexter |
| 958,194 A | 5/1910 | Thomas |
| 967,836 A | 8/1910 | Rodham |
| 969,345 A | 9/1910 | Adamson |
| 1,359,893 A | 11/1920 | Hopkins |
| 1,394,678 A | 11/1921 | DePaoli |
| 1,534,353 A | 4/1925 | Besser |
| 2,021,210 A | 11/1935 | Thorn |
| 2,101,540 A | 12/1937 | Gullich |
| 2,266,510 A | 12/1941 | Pottinger |
| 2,381,613 A | 8/1945 | Mitchell |
| 2,493,826 A | 1/1950 | Oelfke et al. |
| 2,907,129 A | 10/1959 | Bedell |
| 2,931,751 A | 4/1960 | Du Fresne |
| 3,319,392 A | 5/1967 | Fitzgerald |

(Continued)

FOREIGN PATENT DOCUMENTS

| | | |
|---|---|---|
| AT | 191139 | 8/1957 |
| JP | 73010370 | 7/1967 |
| WO | WO8501690 | 4/1985 |

OTHER PUBLICATIONS

Steam Cleaning Concrete, Dec. 15, 2003, http://www.repair-home.com?Steam_Cleaning_Concrete.html.

(Continued)

*Primary Examiner* — Nathan T Leong
(74) *Attorney, Agent, or Firm* — Stetina Brunda Garred & Brucker

(57) ABSTRACT

A method for forming a uniform texture concrete wall using Shotcrete or other pneumatically projected concrete materials. The method generally includes forming an exterior face mixture from a concrete mixture wherein the large aggregates are removed such that when the face mixture is pneumatically applied to a base structure, the face mixture defines a uniform surface.

19 Claims, 4 Drawing Sheets

(56) References Cited

U.S. PATENT DOCUMENTS

| | | | |
|---|---|---|---|
| 3,646,715 A | 3/1972 | Pope | |
| 3,874,140 A | 4/1975 | Seehusen | |
| 4,070,849 A | 1/1978 | DiGiacomo | |
| 4,076,875 A | 2/1978 | Van Gasse | |
| 4,175,639 A | 11/1979 | Wirt | |
| 4,205,040 A | 5/1980 | Aoyama | |
| 4,270,789 A | 6/1981 | Cline | |
| 4,748,788 A | 6/1988 | Shaw | |
| 4,947,600 A | 8/1990 | Porter | |
| 5,196,248 A | 3/1993 | Danico et al. | |
| 5,246,650 A | 9/1993 | Clark | |
| 5,268,137 A | 12/1993 | Scott et al. | |
| 5,492,434 A | 2/1996 | Adams et al. | |
| 5,673,489 A | 10/1997 | Robell | |
| 5,735,094 A | 4/1998 | Zember | |
| 5,794,401 A | 8/1998 | Shaw | |
| 5,887,399 A | 3/1999 | Shaw | |
| 5,950,394 A | 9/1999 | Shaw | |
| 6,016,635 A | 1/2000 | Shaw | |
| 6,033,146 A | 3/2000 | Shaw | |
| 6,082,074 A | 7/2000 | Shaw | |
| 6,112,487 A | 9/2000 | Shaw | |
| 6,164,037 A | 12/2000 | Passeno | |
| 6,330,774 B1 | 12/2001 | Weinstein | |
| 6,609,340 B2 | 8/2003 | Moore et al. | |
| 6,630,041 B1 | 10/2003 | Reiber | |
| 6,785,992 B2 | 9/2004 | Chiarucci | |
| 6,834,438 B1 | 12/2004 | Heister | |
| 6,907,708 B2 | 6/2005 | Naji et al. | |
| 6,955,834 B2 | 10/2005 | Rohrbaugh et al. | |
| 7,242,799 B1 | 7/2007 | Bremsteller | |
| 7,493,732 B2 | 2/2009 | Brailsford et al. | |
| 7,775,499 B2 * | 8/2010 | Metcalf | 249/34 |
| 7,781,019 B2 * | 8/2010 | Shaw et al. | 427/309 |
| 2002/0148195 A1 | 10/2002 | Ward | |
| 2003/0061722 A1 | 4/2003 | Bradley | |
| 2006/0083591 A1 | 4/2006 | Shaw | |
| 2006/0180507 A1 | 8/2006 | DeHart et al. | |
| 2006/0180731 A1 | 8/2006 | Scott et al. | |
| 2007/0071550 A1 | 3/2007 | Shaw et al. | |
| 2007/0071551 A1 | 3/2007 | Shaw et al. | |
| 2007/0086860 A1 | 4/2007 | Shaw et al. | |
| 2007/0101677 A1 | 5/2007 | Brailsford et al. | |
| 2007/0104538 A1 | 5/2007 | Shaw et al. | |
| 2011/0008594 A1 * | 1/2011 | Shaw et al. | 428/206 |
| 2011/0056165 A1 | 3/2011 | Charles, Jr. | |

OTHER PUBLICATIONS

Cement and Concrete Basics, Aug. 22, 2004, http://www.cement.org/basics/concretebasics_placing.asp.

* cited by examiner

METHOD AND FINISH FOR CONCRETE WALLS

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Technical Field of the Invention

The present invention relates generally to a method and finish for concrete walls, and more specifically a method and finish for achieving a uniform exterior texture for concrete walls formed with pneumatically projected concrete, such as Shotcrete.

2. Description of the Related Art

As is well known in the construction industry, concrete is a commonly used material for the fabrication of walls and barriers. The desirability of the use of concrete as a construction material is attributable to certain characteristics that concrete possesses in comparison to other construction materials. More particularly, walls and barriers may be quickly and easily constructed through the use of concrete, with the concrete also imparting a high level of durability to such structures. In addition, the use of concrete for the fabrication of walls and barriers offers a high level of design flexibility since the concrete may be molded into many different shapes and arrangements. The concrete is also easily transportable to construction sites via concrete transport trucks.

Many of the concrete walls that are constructed in accordance with the current state of the art are referred to as cast in place walls. A concrete cast in place wall is typically constructed on-site rather than being manufactured at an off-site facility and subsequently transported to the construction site. The fabrication of a cast in place concrete wall typically begins with the construction of a concrete wall form. Subsequent to the construction of such form, concrete is poured thereinto and is given time to cure. Once the concrete has cured, the corresponding wall form is removed from the fully formed concrete structure. Upon the removal of the form, the exposed walls of the concrete structure may be sandblasted to apply a finishing texture thereto.

One of the deficiencies associated with the currently known cast in place wall construction methodology is that the resultant wall or other structure tends to have a roughened surface texture upon the removal of the form therefrom. In this regard, there tends to be slight inconsistencies in the overall finish of the wall or other structure, such inconsistencies being caused by any one of a number of different factors, including inconsistencies in the form work, sandblasting, finishing, concrete and/or the placing or pumping of the concrete into the form. Further, small holes or other indentations are often found throughout the exposed surfaces of the wall or other structure, such holes or other indentations being formed as a result of the entrapment of air during the forming process. These holes or other indentations are undesirable, in as much as they diminish the aesthetic appeal of the wall or other structure.

In order to avoid the surface finish inconsistencies highlighted above, there has been developed in the prior art a method of creating uniform texture concrete walls. In accordance with this methodology, the concrete wall is "pre cast," with the cast face of the wall being side down and the wall being erected into place through the use of a crane.

However, the aforementioned process of creating uniform texture concrete walls is not well suited to forming concrete structures from pneumatically projected concrete, such as Shotcrete. Shotcrete walls are typically constructed by projecting the concrete onto a back form, and thus, Shotcrete walls generally do not include a cast face, which is side-down in the above-described methodology.

Therefore, there exists a need in the art for a method of forming a smooth or uniform surface on a concrete wall formed by Shotcrete or other pneumatically projected concrete materials.

BRIEF SUMMARY OF THE INVENTION

There is provided a method for forming a smooth or uniform texture concrete wall using Shotcrete or other pneumatically projected concrete materials. The method generally includes forming an exterior face mixture and applying the exterior face mixture upon an underlying base layer formed from Shotcrete. The face mixture is a concrete mixture wherein the large aggregates are removed such that when the face mixture is applied to the base layer, the face mixture defines a smooth and uniform exposed surface.

According to one embodiment, the method includes providing a wall form and pneumatically projecting a first concrete mixture onto the wall form in a non-hydrated state to construct a base concrete layer. A second concrete mixture is provided, wherein the second concrete mixture includes large aggregate and small aggregate. The large aggregates are removed from the second concrete mixture to define the face mixture, which is applied to the base concrete layer while the base concrete layer is in the non-hydrated state.

The face mixture may be applied to the concrete base layer while the base concrete layer is in a plastic state. According to one implementation, the face mixture is applied within four hours after the base concrete layer is formed, while in another embodiment, the face mixture is applied within one hour after the base concrete layer is formed.

The face mixture may be applied pneumatically, by hand, or using other techniques known in the art.

In one embodiment, the second concrete mixture may be formed from the first concrete mixture, while in another embodiment, the second concrete mixture may be formed independent of the first concrete mixture, i.e., from a standalone batch.

The method may additionally include the step of pouring a foundation upon which the base concrete layer is constructed. Rebar may be installed within the form to provide structural support. Furthermore, at least one wire gauge may be installed to control the depth of the base layer.

At least one additive may be added to the face mixture to create a desired appearance. The additive may include a color agent, sand, cement, an aggregate, a polymer, a bonder or an admixture. Furthermore, sands or aggregates may be broadcast upon the face mixture.

The face mixture and the base layer may be allowed to harden to define a concrete wall. The method may further include exposing the wall The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein.

Common reference numerals are used throughout the drawings and detailed description to indicate like elements.

DETAILED DESCRIPTION OF THE INVENTION

Figure 1:
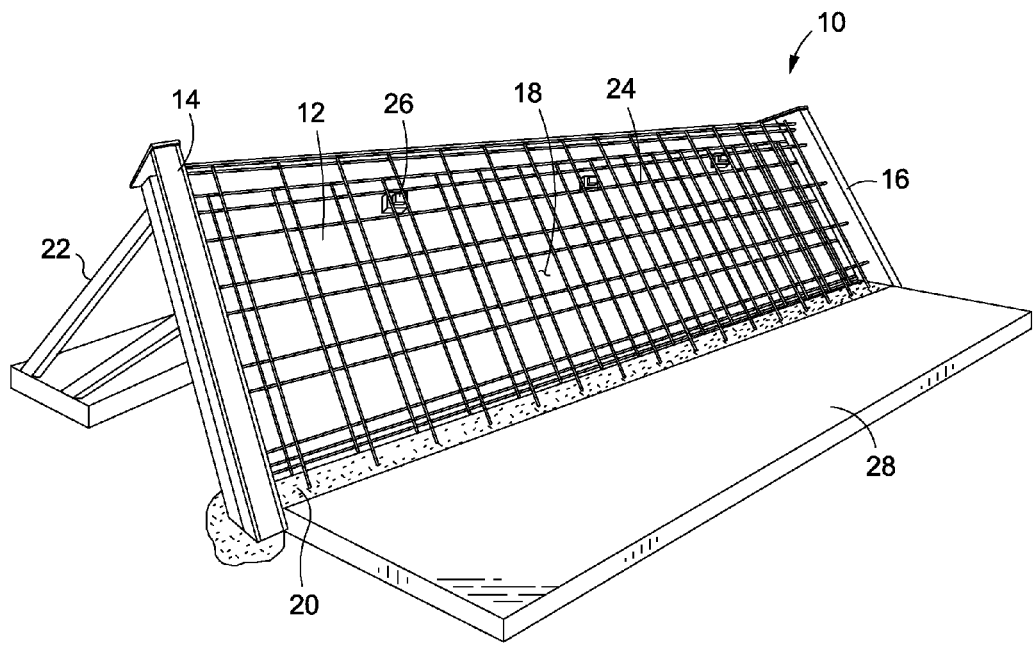
FIG. 1 is an upper perspective view of a wall form used to construct a concrete wall.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for purposes of illustrating a preferred embodiment of the present invention only, and are not for purposes of limiting the same, there is depicted a novel and unique method of forming a concrete wall. The method generally includes forming an underlying concrete base layer and then applying a concrete face mixture to the base layer while the base layer is still in a plastic or non-hydrated state. This allows for the face mixture to be applied without polymers or bonders, which drastically reduces labor and material costs. The hardening time is further reduced or eliminated, which additionally helps with project scheduling and sequencing. The face mixture is preferably a concrete mixture wherein large aggregates have been removed, and thus, is formed primarily of smaller aggregates such that the face mixture defines a uniform texture and appearance.

FIG. 1 depicts a wall form 10 used for constructing a concrete wall according to an aspect of the present invention. The exemplary wall form 10 includes a back panel 12 and a pair of opposed side panels 14, 16 disposed on opposite ends of the back panel 12. The back panel 12 and side panels 14, 16 collectively define a cavity 18 within which concrete may be disposed. The wall form 10 may be positioned over a foundation 20 upon which the concrete wall may be constructed.

The position and orientation of the wall form 10 may correspond to the desired position and orientation of the concrete wall. In the exemplary embodiment depicted in FIG. 1, the wall form 10 supported by a brace 22 to maintain the wall form 10 at a slightly angled orientation relative to a vertical plane, although it is understood that the wall form 10 may be arranged in a generally vertical configuration. Irrespective of the vertical orientation of the wall form 10, the brace 22 may additionally be operative to support the wall form 10 so as to maintain the wall form 10 in its upright configuration when concrete is projected thereon, as will be described in more detail below.

The wall form 10 depicted in the Figures is used to create a wall having a generally quadrangular cross-section. It is understood that the methodologies described herein may be used with wall forms 10 that define other shapes and sizes.

Internal support members, such as rebar 24 may be positioned within the cavity 18 so as to become encapsulated by the concrete as it is projected into the cavity 18 to provide internal support to the concrete wall. The rebar 24 may be arranged to define a lattice framework to provide support along at least two axes. Furthermore, the rebar 24 may be positioned within two separate planes and may be spaced from the back wall 12 using spacers 26 to position the rebar 24 in space relation to each other.

Although the Figures depict rebar 24 disposed within the cavity 18, it is understood that other items may be placed within the cavity 18 before concrete is projected therein. For instance, a wire gauge may be installed to measure the depth of the concrete projected into the cavity 18. Furthermore, electrical lines may be placed within the cavity 18 if the concrete wall includes lights or an electrical outlet. Drainage lines or other plumbing lines may additionally be included as needed.

Figure 2:
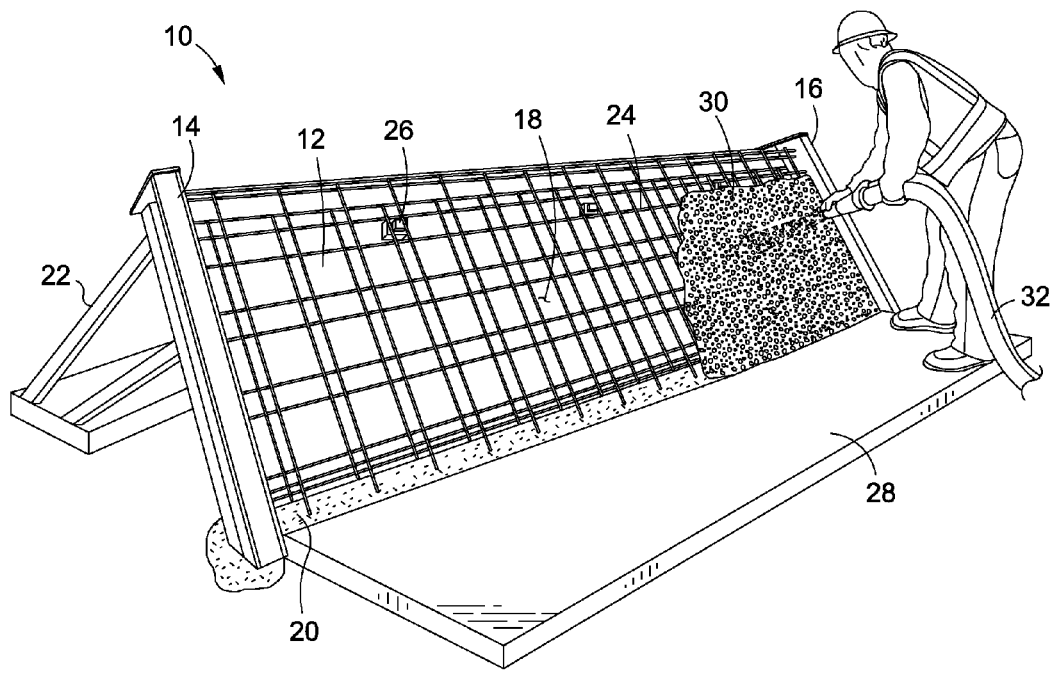
FIG. 2 is an upper perspective view of a first concrete mixture being projected into the wall form.

A floor panel or lower panel 28 may be used with the wall form 10 to provide a flat surface for a worker to stand on when filling the cavity 18 with concrete, as is shown in FIG. 2. The lower panel 28 may extend between the pair of opposing side panels 14, 16 and have an inner edge that is parallel to a lower edge of the back panel 12.

Referring now to FIG. 2, the cavity 18 of the wall form 10 is being filled with a concrete mixture 30 (i.e. a first concrete mixture). In the exemplary embodiment, the first concrete mixture is pneumatically projected into the cavity 18 using a hose 32 which is connected to a pump (not shown) which pumps the first concrete mixture 30 from a holding tank into the cavity 18.

The first concrete mixture 30 may include Shotecrete, gunite or other similar concrete mixtures known by those skilled in the art, and preferably includes a combination of small and large aggregate. Along these lines, the first concrete mixture 30 preferably does not form any portion of an exposed surface of the finished concrete wall, and as such, will be covered by a face mixture, as will be described in more detail below. Therefore, it is not necessary for the first concrete mixture 30 to define a uniform or aesthetically pleasing texture since it will be covered by a face mixture.

Figure 3:
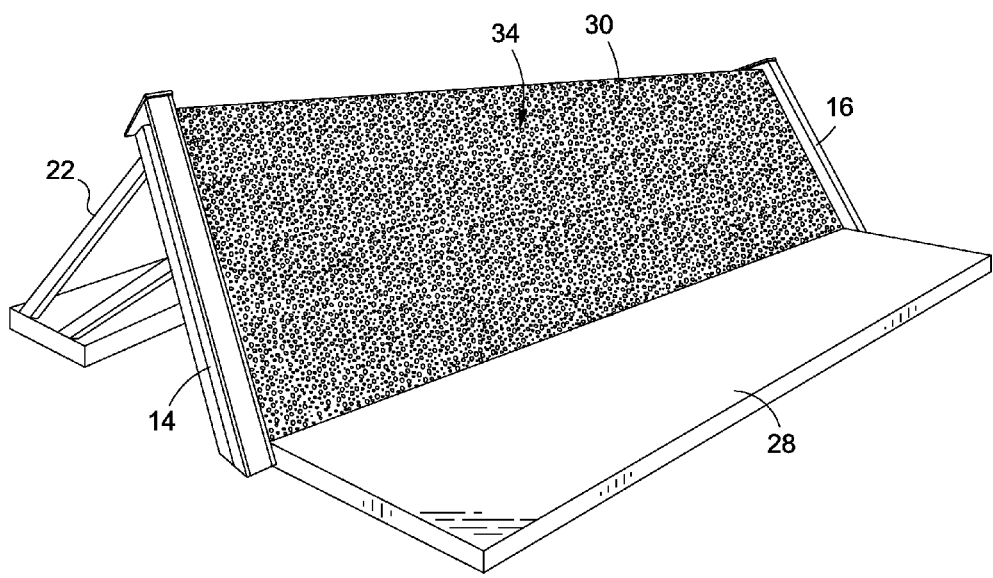
FIG. 3 is an upper perspective view of a base concrete layer constructed within the wall form.

The first concrete mixture 30 is projected into the cavity 18 until the cavity 18 is filled (or substantially filled) therewith to define a base layer 34, as shown in FIG. 3. While the base layer 34 is still in a non-hydrated, plastic state, a concrete face mixture 36 (i.e., a second concrete mixture) is disposed over the base layer 34. By applying the face mixture 36 to the base layer 34 while the base layer 34 is in a non-hydrated state, the joint between the face mixture 36 and the base layer 34 is not a cold joint.

The primary distinction between the face mixture 36 and the first concrete mixture 30 is that the face mixture does not include large aggregate, while the first concrete mixture 30 preferably does include large aggregate. Large aggregate may include large pieces of gravel or crushed stone commonly found in conventional concrete mixtures. Thus, such large aggregates may be removed from a conventional concrete mixture to form the face mixture 36, or the face mixture 36 may be formed without the large aggregates.

Figure 4:
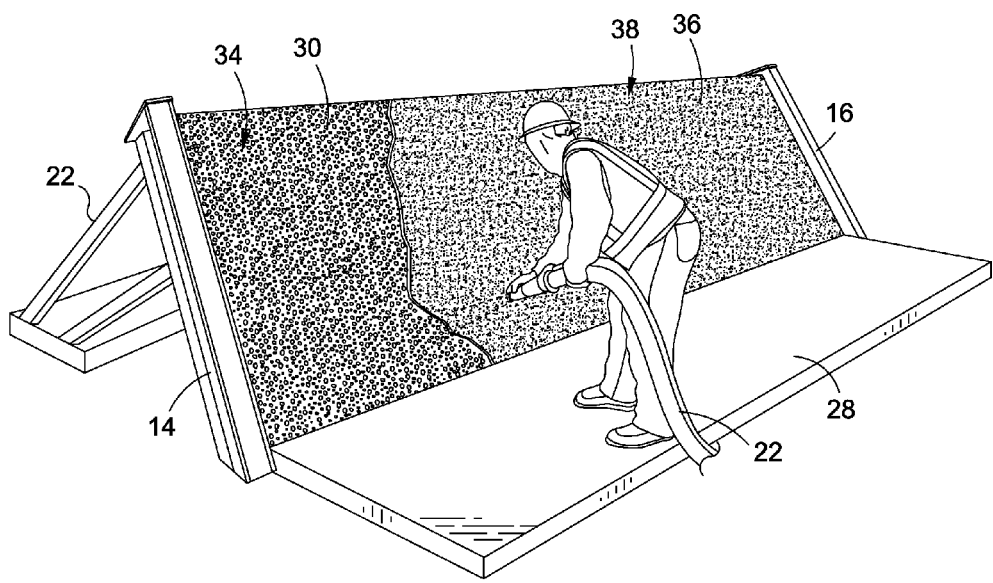
FIG. 4 is an upper perspective view of a face mixture being projected on the base concrete layer in the wall form.
Figure 5:
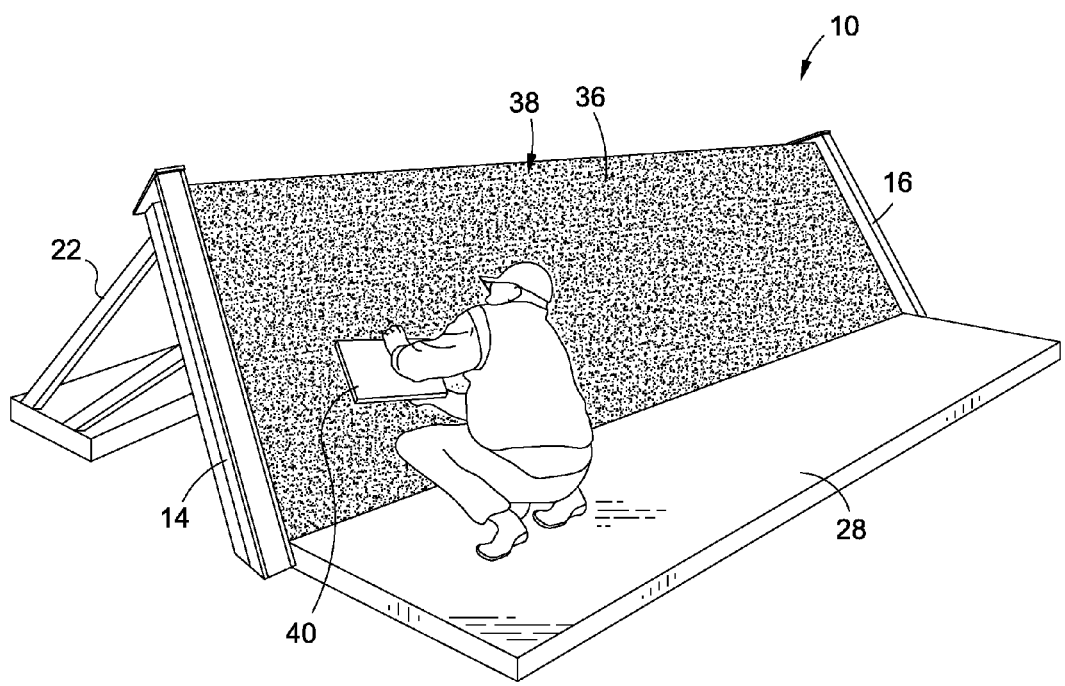
FIG. 5 is an upper perspective view of a finishing step being performed on the face mixture.
Figure 6A:
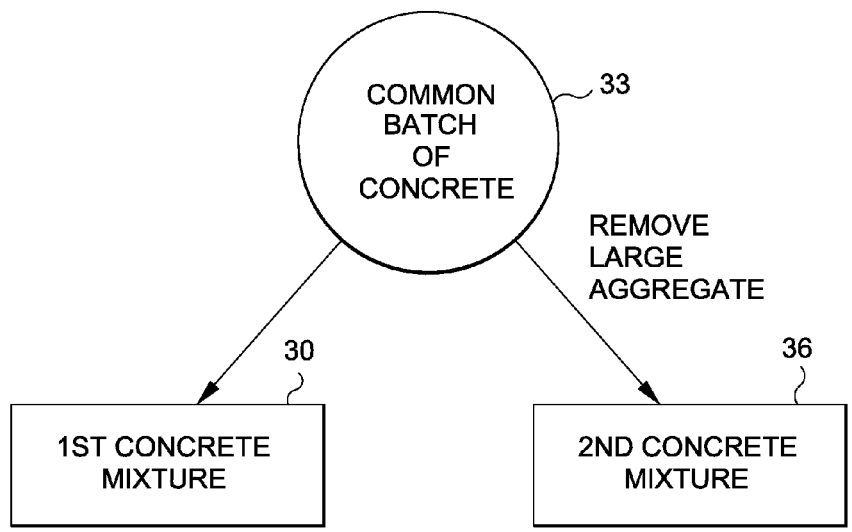
FIG. 6A is a schematic view of a process of forming first and second concrete mixtures from a common batch of concrete.

According to one embodiment, and referring now specifically to FIG. 6A, the face mixture 36 and the first concrete mixture 30 are taken from a common batch of concrete 33. In this regard, the face mixture 36 may be formed by removing the large aggregate from the first concrete mixture 30. Along these lines, concrete from the common batch may be poured into a separate holding tank and screened to remove the large aggregate from the concrete mixture. A strainer or similar separating device may be used to remove the large aggregate from the first concrete mixture 30. The resultant mixture is the face mixture 36, which is applied to the base layer 34 as shown in FIG. 4. The use of a common batch of concrete 33 to form both the first and second concrete mixtures 30, 36 may beneficially allow for color and structural consistency between the base layer 34 and the outer layer 38.

Figure 6B:
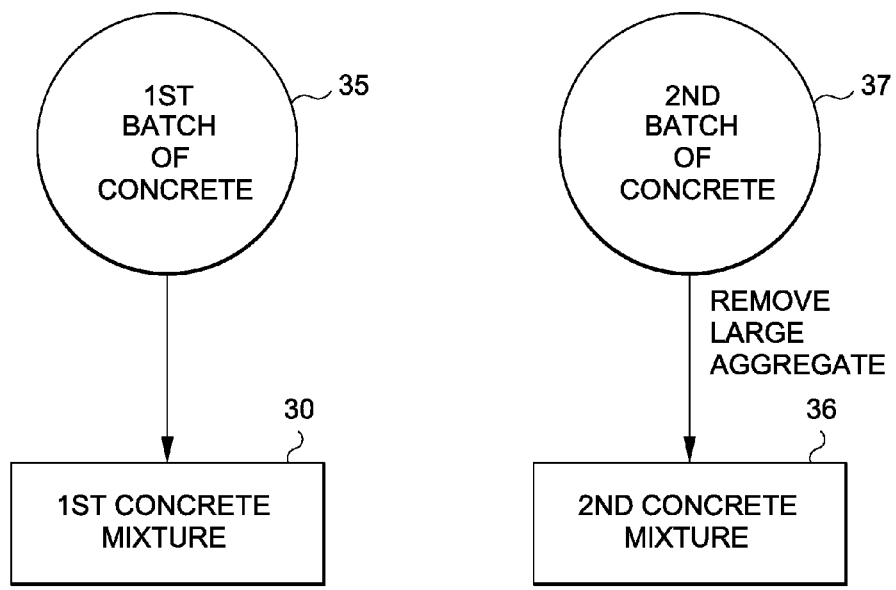
FIG. 6B is a schematic view of a process of forming first and second concrete mixtures from separate batches of concrete.

In another embodiment, and referring now specifically to FIG. 6B, the face mixture 36 is formed separate from the first concrete mixture 30 such that the first concrete mixture 30 and the face mixture 36 do not emanate from a common batch of concrete. Rather, the first concrete mixture 30 is formed from a first batch of concrete 35 and the face mixture 36 is formed from a second batch of concrete 37, which is completely independent or separate from the first batch of concrete 35. Although the first concrete mixture 30 and the face mixture 36 may be formed separately, the second batch of concrete 37 may still include large and small aggregates, and therefore, the large aggregates are removed from the second batch of concrete 37 to form the face mixture 36.

In yet another embodiment, the face mixture 36 may be specifically ordered to include only small aggregate and not to include large aggregate. In this regard, the face mixture 36 would may be formed without any additional manipulation of a base concrete mixture (i.e., without removal of the large aggregates therefrom).

The face mixture 36 will define the exterior of the concrete wall and thus specific aesthetic qualities may be desired of the finishing mixture 36. For instance, select sands, color minerals, small materials and aggregates may be added to the face mixture 36, as required, to define a desired appearance.

The face mixture 36 is applied to the base layer 34 while the base layer 34 is still in a plastic state. In this regard, the face mixture 36 is preferably applied to the base layer 34 within four hours after forming the base layer 34, and more preferably within an hour after the formation of the base layer 34. By applying the face mixture 36 while the base layer 34 is still in a plastic state, the finishing mixture 36 may be applied without polymers or bonders which drastically reduces labor and material costs.

The face mixture 36 may be applied to the base layer 34 using a pneumatic device such as the hose 22 depicted in FIG. 4. It is also contemplated that the face mixture 36 may be applied by hand without departing from the spirit and scope of the present invention.

Once the face mixture 36 is applied, the face mixture 36 may be floated with a float 40 and allowed to harden. After hardening, the wall may be exposed by applying a surface retarder, by acid etching, by chemically etching, by sandblasting, or by grinding or honing. After which, the wall may be acid cleaned and a sealer may be applied to the wall. Furthermore, the wall form 10 may be removed from the wall after the wall hardens.

According to various aspects of the present invention, the formation of the concrete wall including the underlying base layer 34 and the outer face layer 38 formed using the face mixture 36 allows the majority of the wall to be formed by conventional means (i.e., the base layer 34), while the outer layer 38 is formed with the unique face mixture 36 to create a uniform surface texture.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. A method of forming a concrete wall, the method comprising the steps of:
   providing a wall form;
   pneumatically projecting a first shotcrete concrete mixture in a non-hydrated state onto the wall form to construct a base concrete layer;
   providing a second concrete mixture including large aggregate and small aggregate;
   removing the large aggregate from the second concrete mixture to define a face concrete mixture; and
   applying the face concrete mixture to the base concrete layer while the base concrete layer is in the non-hydrated state.

2. The method recited in claim 1, wherein the face mixture is applied within four hours after the base concrete layer is formed.

3. The method recited in claim 1, wherein the face mixture is applied within one hour after the base concrete layer is formed.

4. The method recited in claim 1, wherein the step of providing the second concrete mixture includes forming the second concrete mixture from the first shotcrete concrete mixture.

5. The method recited in claim 1, wherein the step of providing the second concrete mixture includes forming the second concrete mixture independent of the first shotcrete concrete mixture.

6. The method recited in claim 1, further comprising the steps of:
   pouring a foundation upon which the base concrete layer is constructed;
   installing rebar within the form; and
   installing at least one wire gauge to control the depth of the base concrete layer.

7. The method recited in claim 1, further comprising the step of adding at least one of a coloring agent, sand, cement, an aggregate, a polymer, a bonder or an admixture to the face mixture.

8. The method recited in claim 1, wherein the face mixture is pneumatically applied to the base concrete layer.

9. The method recited in claim 1, wherein the face mixture is applied to the base mixture by hand.

10. The method recited in claim 1, further comprising the step of broadcasting sands and aggregates toward the face mixture.

11. The method recited in claim 1, further comprising the steps of:
    allowing the face mixture and base concrete layer to harden to define a concrete wall; and
    exposing the wall.

12. A method of forming a concrete wall, the method comprising the steps of:
    providing a wall form;
    pneumatically projecting a first shotcrete concrete mixture in a non-hydrated state onto the form to construct a base concrete layer, the first shotcrete concrete mixture including a combination of large aggregate and small aggregate;
    providing a face mixture formed independent of large aggregate, wherein providing the face mixture includes removing large aggregate from a second concrete mixture including large aggregate and small aggregate; and applying the face mixture onto the base concrete layer while the base concrete layer is in the non-hydrated state.

13. The method of claim 12, wherein the second concrete mixture is formed from the first shotcrete concrete mixture.

14. The method of claim 12, wherein the second concrete mixture is formed independent of the first shotcrete concrete mixture.

15. The method recited in claim 12, further comprising the steps of:
   pouring a foundation upon which the base concrete layer is constructed;
   installing rebar within the form; and
   installing at least one wire gauge to control the depth of the base concrete layer.

16. The method recited in claim 12, further comprising the step of adding at least one of a coloring agent, sand, cement, an aggregate, a polymer, a bonder or an admixture to the face mixture.

17. The method recited in claim 12, wherein the face mixture is pneumatically applied to the base concrete layer.

18. The method recited in claim 12, wherein the face mixture is applied to the base mixture by hand.

19. The method recited in claim 12, further comprising the step of broadcasting sands and aggregates toward the face mixture.

\* \* \* \* \*